Sept. 27, 1949.  W. F. JACKSON  2,483,202
LIGHT REFLECTING DEVICE
Filed May 4, 1946  2 Sheets-Sheet 2
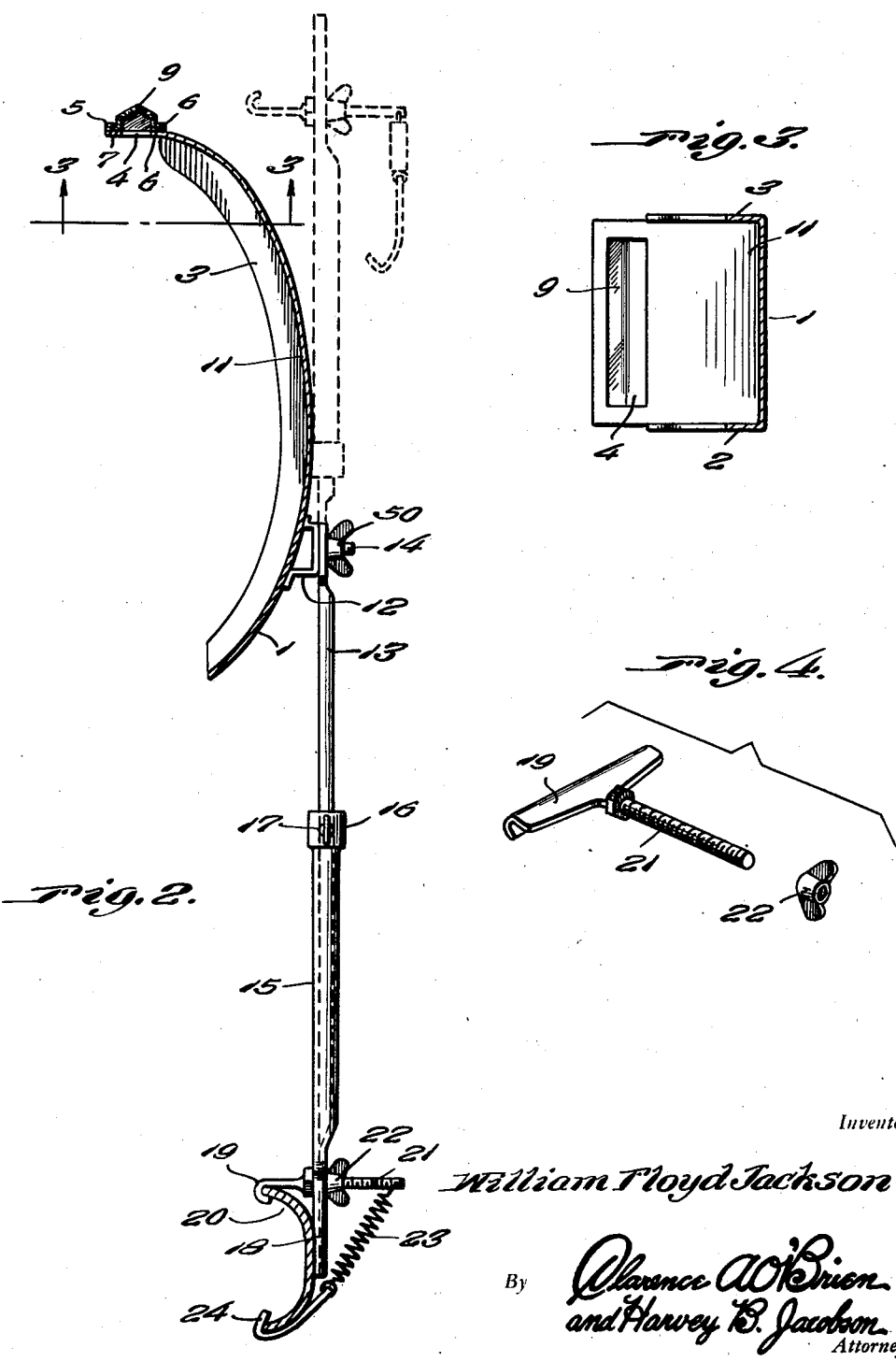

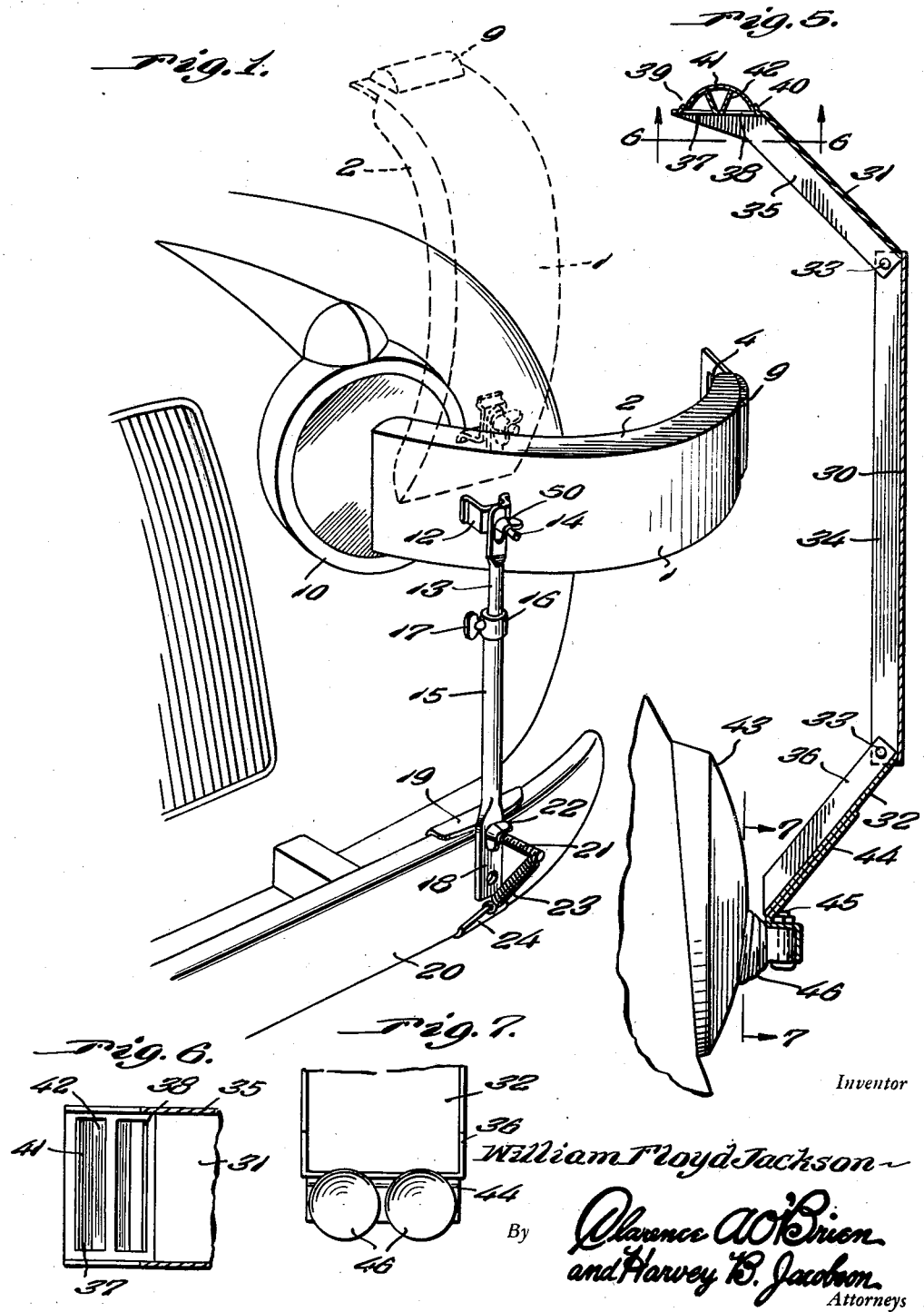

Patented Sept. 27, 1949

2,483,202

UNITED STATES PATENT OFFICE 2,483,202

LIGHT REFLECTING DEVICE

William Floyd Jackson, Wilmington, Del., assignor to W. Floyd Jackson Co., Wilmington, Del., a corporation of Delaware Application May 4, 1946, Serial No. 667,277

2 Claims. (Cl. 240—8.2)

This invention relates to improvements in light reflecting devices for motor vehicles.

An object of the invention is to provide an improved light reflecting device for motor vehicles which will be secured to the front bumper or the headlight of said vehicle for reflecting the light from the headlight laterally of said vehicle to illuminate the road on the left or passing side thereof.

Another object of the invention is to provide an arcuate shaped light reflector for motor vehicles which will be suitably supported on said vehicle forwardly of one of its headlights, the same being angularly adjustable to direct the light from said headlight laterally and to the rear of said vehicle to clearly illuminate the center of the road to provide better vision for the driver of an approaching vehicle when passing.

A further object of the invention is to provide a combined adjustably supported light deflecting device and signal light for motor vehicle headlights which will illuminate the middle of the road for safely passing other vehicles, and for providing a red light signal to indicate the inner limit of the vehicle to warn against passing too closely.

Another object of the invention is to provide an improved portable and adjustable headlight supported reflector for motor vehicles which may be supported by suction cups on the front of the headlight lens to reflect the light from the headlight to the side of the vehicle to provide safety in passing approaching vehicles or when being passed by vehicles going in the same direction.

Another object of the invention is to provide an improved light reflecting device for motor vehicles which will be highly efficient in operation, and relatively inexpensive to manufacture and produce.

Other objects will appear as the description proceeds.

In the accompanying drawings which form a part of this application,

Figure 1 is a perspective view of the improved light reflecting device showing the same attached to a motor vehicle bumper;

Fig. 2 is a vertical sectional view through the integral light reflecting device, with its supporting means shown in operative position in full lines, and shown in dotted lines in its folded position;

Figure 3 is a sectional view taken on the line 3—3 of Figure 2;

Figure 4 is an exploded view of the clamping support screw with associated wing nut;

Figure 5 is a vertical sectional view of the folding type of light reflecting device showing the same attached by suction cups to the headlight lens;

Figure 6 is a sectional view taken on the line 6—6 of Figure 5, and

Figure 7 is a view taken on the line 7—7 of Figure 5.

Like characters of reference are used throughout the following specification and the accompanying drawings to designate corresponding parts.

In carrying out the invention, there is provided an improved light deflecting device, the body 1 of which is arcuate in shape and formed with the integral oppositely disposed parallel extending flanges or sides 2 and 3. The upper end of the body 1 is transversely slotted as at 4, and is provided with the opposed upwardly and inwardly directed locking flanges 5 and 6 which are adapted to extend over the flanges 7 and 8 formed on the red signal lens 9, which may be made of glass or plastic, or any other appropriate material, whereby when the deflector is supported forwardly of a headlight 10, the light from said headlight will be reflected by the mirrored or reflecting surface 11 covering the complete inside surface of the deflector body 1, to reflect the light to the side of the vehicle to illuminate the middle of the road. The light from the headlight 10 will also be reflected upwardly through the slot 4 in the body 1 to illuminate the red glass or plastic signal lens 9 to give a visual indication to drivers of approaching vehicles of the lateral limit of the said vehicle.

A U-shape bracket 12 will be secured to the outer surface of the body 1, and will be connected to the upper end of the supporting rod 13 by means of the bolt 14 and the wing nut 15. The rod 13 will be telescopically received within the tubular supporting arm 50, which is formed with the collar 16 about its end and a wing locking bolt 17 extending therethrough to engage and hold the rod 13 in its adjusted position. The lower end of the arm 15 is flattened as at 18, and is apertured to receive the hooked bolt 19 which is adapted to engage over the upper edge of a vehicle bumper 20, said bolt 19 being held in position by means of the nut 21 and wing adjusting clamping nut 22 at opposite sides of said flattened end 18. A coil spring 23 is supported at one end to the end of the bolt 19 and its other end is secured to the hooked clip 24, whereby the said clip may be engaged under the lower edge of the bumper 23 and resiliently held in place thereon. The form of the invention just described will be preferably used in connection with motor trucks and the like.

In Figures 5, 6 and 7, there is illustrated a modified form of light deflector device which will be preferably used on and in connection with passenger type motor vehicles. In this form, the body 30 of the deflector is provided with the oppositely extending upper and lower end portions 31 and 32 respectively, which are pivotally supported on the pivot pins 33 to the opposite ends of said body portion 30. Opposed inwardly directed integral flanges or sides 34, 35, and 36 are formed respectively on the central body portion 30 and the upper and lower end portions 31 and 32, and the inner surfaces of said body portion and end portions will be formed with mirrored or reflecting surfaces.

The upper end of the end portion 31 is provided with the spaced transversely extending slots 37 and 38 and with the locking flanges 39 and 40 disposed at the edges of said slots being adapted to engage and positively support the red glass warning lens 41 disposed to overlie said slots. An inverted V-shape reflector 42 will be supported above and between said slots 37 and 38 to reflect the light from the headlight 43 and the mirrored inner surfaces of the deflector to illuminate the red glass lens to indicate to drivers of approaching vehicles the lateral or inner limit of the vehicle.

An offset bracket member 44 will be suitably secured to the outside surface of the lower end portion 32, and will support the depending spaced bolts 45 upon which the suction cups 46 are adjustably mounted. The suction cups 46 will be secured to the forward surface of the lens 47 of the headlight 48 of the vehicle, in such a manner that the light from said headlight will be reflected rearwardly or laterally to the side of the vehicle, due to the angular adjustability of the light deflector and its supporting means.

When not in use, the deflector may be folded up, or its support telescoped to permit it to be removed and stored in a small space in the trunk portion of a vehicle.

From the foregoing description, it will be apparent that there has been provided a highly efficient form of light deflecting means for vehicles, which will be positioned therefrom to utilize the light from a headlight to reflect the light laterally of the vehicle or to the side thereof to illuminate the roadway so that the driver of an approaching vehicle will be able to see the position of the said vehicle upon the road and to safely pass the same.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A reflector for attachment to the headlight of an automobile to deflect light rays from the headlight laterally to one side of the automobile comprising an elongated body having a rear reflecting face, a pair of reflecting sections at the ends of said body inclining from the reflecting face of said body in relatively flaring relation with rear reflecting faces, said sections being pivoted to said ends for varying the angle of inclination of the sections, and means to attach one section to said headlight with the reflector extending laterally of said headlight in front thereof and beyond said side of the automobile.

2. A reflector for attachment to the headlight of an automobile to deflect light rays from the headlight laterally to one side of the automobile comprising an elongated body having a rear reflecting face, a pair of reflecting sections at the ends of said body inclining from the reflecting face of said body in relatively flaring relation with rear reflecting faces, said sections being pivoted to said ends for varying the angle of inclination of the sections, and means to attach one section to said headlight with the reflector extending laterally of said headlight in front thereof and beyond said side of the automobile, the other section having reflecting means on the front face thereof for indicating forwardly of the reflector the distance to which the reflector extends beyond said side of the automobile.

WILLIAM FLOYD JACKSON.

REFERENCES CITED

The following references are of record in the file of this patent:

UNITED STATES PATENTS

| Number | Name | Date |
|---|---|---|
| 121,920 | Winchell | Dec. 27, 1871 |
| 718,309 | Brown | Jan. 13, 1903 |
| 1,497,608 | Strong | June 10, 1924 |
| 1,525,114 | Yoscary | Feb. 3, 1925 |
| 1,528,562 | Parkhurst | Mar. 13, 1925 |
| 1,687,144 | Ringers | Oct. 9, 1928 |
| 1,723,863 | Jeffrey | Aug. 6, 1929 |
| 1,740,588 | Hamilton | Dec. 24, 1929 |
| 1,921,755 | Karlson | Aug. 8, 1933 |

FOREIGN PATENTS

| Number | Country | Date |
|---|---|---|
| 264,323 | Great Britain | Jan. 20, 1927 |
| 322,407 | Great Britain | Dec. 5, 1929 |
| 396,451 | Great Britain | Aug. 10, 1933 |